May 19, 1959
J. A. PETERSON
2,886,996
FRICTION VISE
Filed May 13, 1957
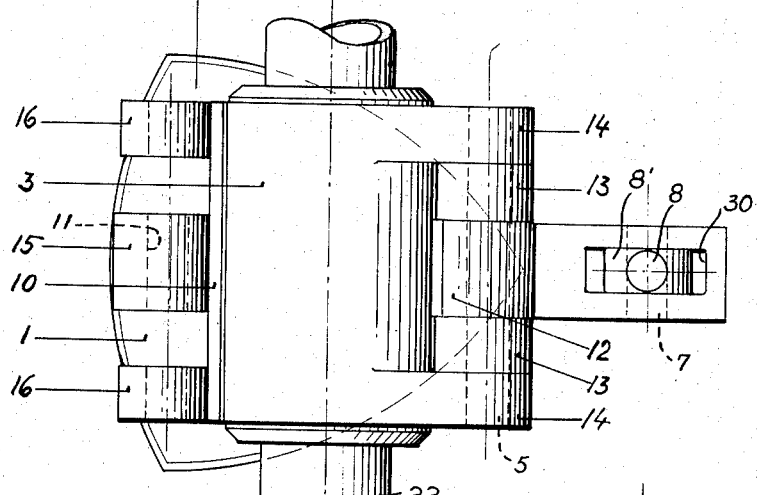
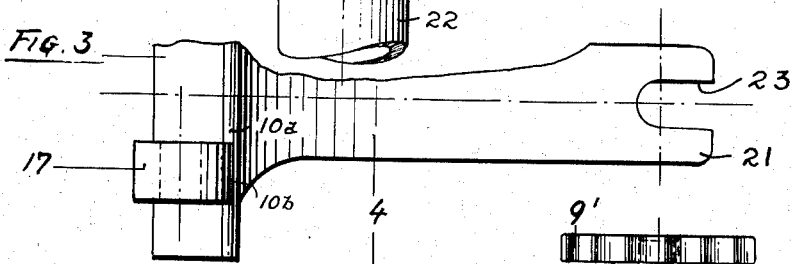
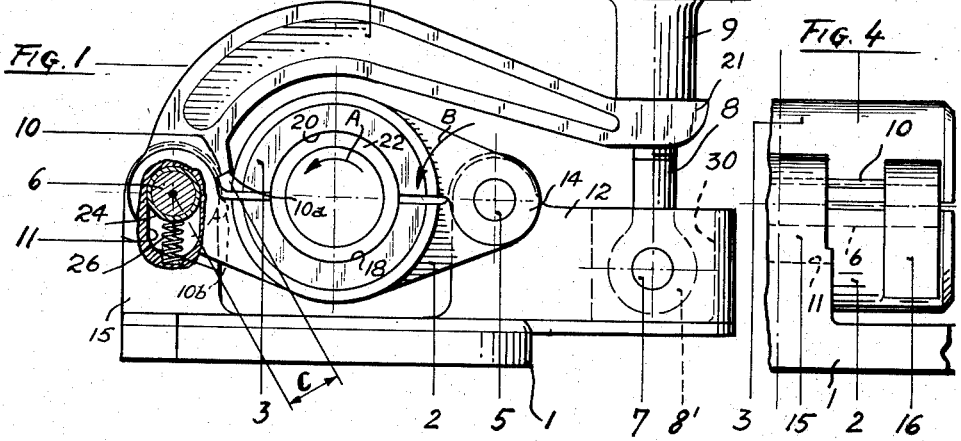
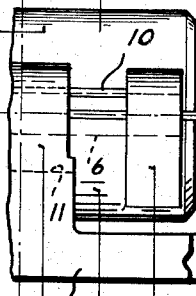
INVENTORS
JOSEPH A. PETERSON
CARL E. OLSEN
BY
Cushman, Darby & Cushman
ATTORNEYS

United States Patent Office 2,886,996
Patented May 19, 1959

2,886,996

FRICTION VISE

Joseph A. Peterson and Carl E. Olsen, Houston, Tex.

Application May 13, 1957, Serial No. 658,763

15 Claims. (Cl. 81—19)

The present invention relates to vises of the type particularly adapted to hold round-work objects such as pipes or bars while torques are applied thereto.

Conventional vises of this general type are usually quite complicated and expensive and oftentimes require considerable strength and skill, on the part of the workman, in their operation. Furthermore, conventional vises of this type have been found to be particularly unsatisfactory and inefficient when utilized to hold work objects having highly polished, smooth, and/or greasy external surfaces. In use with highly polished bars or pipes, the conventional vise has to be tightened to such a degree that in many instances, the gripping surfaces scratch or mar the surface of the work object. Understandably, this is highly undesirable in cases when the work object must retain its smooth and highly polished exterior surfaces for proper operation thereof in machinery, etc.

Accordingly, it is an important object of the invention not only to provide a novel, inexpensive and conveniently operated vise but also to provide a vise particularly adapted to be utilized in connection with work objects having highly polished, smooth, and/or greasy external surfaces.

Another object is to provide an improved vise construction operable upon the application of torques to the work object embraced thereby, to increase or tighten its grip thereon.

A more specific object resides in the provision of a vise having pivotally interconnected jaws and a clamping arm constructed and arranged to produce a friction grip on the work object which gets tighter as torques are applied to the work object.

Further objects and advantages of the invention will be in part obvious and in part pointed out hereinafter.

The novel features of the invention may be best made clear from the following description and accompanying drawings in which:

Figure 1 is a side elevation of a vise of the invention shown in operative position embracing a work object and partially cut away for clearer illustration of certain parts;

Figure 2 is a plan view of the vise of Figure 1 with certain parts thereof removed for purposes of illustration;

Figure 3 is a fragmentary bottom plan view of the clamping arm shown in Figure 1; and Figure 4 is a fragmentary end elevation of the vise of Figure 1 with certain parts removed.

Referring to Figure 1 of the drawings, the invention in a broad sense includes a base 1, a plurality of pivotally interconnected jaws, such as those identified by numerals 2 and 3, and a clamping arm or handle 4 arranged in the following manner. The jaws are connected to the base 1 and the clamping arm 4 is pivoted to one end of one of the jaws and extends transversely across the work object embraced by the jaws, with cooperable abutting surfaces being provided on the arm and the other of said jaws adapted to produce the desired gripping action on the work piece when the clamping arm is latched in its operative position.

In a more specific sense, the invention embraces the provision of a latching means for the clamping arm which facilitates loading and unloading of the vise and additionally permits convenient manual adjustment of the tightness of the grip on the work object.

And in a still more specific sense, the invention contemplates the pivotal connection of the jaws to the base so that they are continuously urged, by their weight, to swing bodily toward the base, with resilient means resisting and normally overcoming this tendency of the jaws to pivot toward the base. By virtue of this aspect, as will be explained more fully hereinbelow, the grip of the jaws on the work piece is tightened upon the application of torques to the work object.

In the illustrative embodiment of the invention now to be described, the base 1 is shown as being somewhat triangular in plan view, including an upstanding, apertured lug 12 at the right-hand end thereof as viewed in Figures 1 and 2, and an upstanding, apertured lug 15 on the left-hand end thereof, aligned with lug 12 as shown. The number of jaws is shown in this embodiment to be two, however, it will be evident that a larger number thereof may be utilized. Lower jaw 2 includes apertured ears 13 disposed at right-hand end thereof and arranged in embracing relationship to the lug 12 as best seen in Figure 2. The right-hand end of upper jaw 3 also includes spaced apertured ears 14 embracing the ears 13 as shown, and a pivot pin 5 is inserted through the aligned, transverse apertures in lug 12 and ears 13, 14, as best shown in Figure 2, whereby the jaws are pivotable or swingable, bodily, relative to the base 1, and they are also pivotable with respect to each other, all such pivoting taking place about the axis of pin 5.

In the position of the jaws illustrated in Figure 1, it will be evident that the weight of the jaws continuously urges them to pivot bodily toward the base 1, about the axis of pin 5. The jaws 2, 3 may be of any desired length and width, each jaw being formed with a longitudinally extending, circularly arcuate groove, such as those indicated by numeral 18 for jaw 2 and numeral 20 for jaw 3. These grooves are subsatntially semicircular in transverse section, and in the closed position of the jaws the circular surfaces of these grooves 18, 20 cooperate to define a cylindrical conformation corresponding to and embracing the cylindrical work object 22.

The clamping arm 4 is formed with two spaced and depending, transversely apertured ears 17 located on each side of the longitudinal axis thereof, as indicated in Figure 3, and such ears preferably are fitted on either side of and in lateral engagement with the lug 15 on base 1. Transversely apertured ears 16 are formed on the left-hand end of the lower jaw 2 and embrace the ears 17 on the clamping arm, with a pivot pin 6 inserted through the aligned, transverse apertures in the lug 15 and ears 16 and 17. With this construction, the clamping arm is pivotable relatively to the jaws, and as an important feature of the invention, the clamping arm bears against the free or left end of the upper jaw 3 with a contact pressure of great magnitude, produced by downward pressure on the free or right end of the clamping arm by latching structure to be described hereinbelow.

In the illustrative embodiment of the invention, the free or left end of the upper jaw 3 includes a lip terminating in a surface 10 which inclines upwardly and to the right as shown in Figure 1; while the adjacent portion of the clamping arm includes a complementarily inclined surface 10a abuttingly contacting the surface 10, as shown, when the clamping arm is locked in closed-jaw position.

The clamping arm may be somewhat arched longitudinally, as shown, and is adapted to extend transversely across the work object 22, from the left to the right thereof, terminating preferably in a bifurcated free or right end 21, defining a slot 23, disposed above the lug 12 when the surfaces 10, 10a are in engagement.

A latch is provided on the base for detachably engaging the free end 21 of clamping arm 4, and again referring to the illustrative embodiment of the invention, this latch includes a bolt or screw 8 arranged at its lower end 8' in a hole 30 formed in lug 12, as shown, and retained therein by a transverse pivot pin 7 extending therethrough, whereby the screw may be swung in a vertical path perpendicular to the longitudinal axis of the work piece 22 as indicated in the drawings. A tightening nut 9 is screwed onto the threaded upper end of screw 8 and preferably includes a knob 9' which may be vertically fluted as shown, or knurled to facilitate manual operation thereof.

As is evident, the screw 8 is swung to the left into the slot 23 at the right end of the clamping arm 4 and the nut 9 tightened down against said end for latching or locking the vise in loaded position. To unload the vise, the nut 9 is loosened and the bolt 8 is swung to the right out of engagement with the clamping-arm end 21, so that the arm 21 and jaw 3 may be pivoted to the left and right respectively to free the work object. It will be appreciated that in loaded position, the downwardly directed force exerted on the right-hand end of the clamping arm 4 by the nut 9 is effective, by reason of its relatively large moment arm measured to the axis of pin 6, to produce contact pressures between the surfaces 10, 10a that are of substantial magnitude, inasmuch as the generally downwardly directed force exerted on the surface 10 of jaw 3 acts through a relatively small lever arm, the magnitude of which arm is indicated by the letter C in Figure 1. Thus, it is possible with the vise of the invention to effectuate superior and greater gripping action of the jaws around the work piece by simple tightening adjustment of the nut 9. This is an outstanding feature of the invention and is particularly advantageous where the work object 22 has a highly polished, smooth, and/or greasy exterior which must remain unmarred and unscratched during the time operations are performed thereon while it is in the vise. In this connection, the work-object-embracing surfaces 18, 20 of the jaws 2, 3, respectively, may be machined to a highly finished degree, to minimize the danger of surface marring when the jaws are tightened against the work object. Although not preferred, split sleeves of a relatively soft metal may be utilized, one in each groove 18, 20 for this same purpose.

Another outstanding feature of the invention resides in the ability of the jaws 2, 3 to tighten their grip on the work object 22 when torques are applied to the latter. In endowing the vise with this desirable characteristic, which is also particularly advantageous where highly polished or slippery pipes or bars are involved, the illustrative vise embodiment includes a generally vertically elongated, transverse aperture 11 formed in the lug 15 (see Figure 1). The pivot pin 6 extends through this aperture and resilient means are arranged to bear upwardly against the pin 6 so as to resist the tendency of the jaws 2, 3, and arm 4 to pivot bodily, by reason of their weight, toward the base 1, in the direction indicated by an arrow B. In this manner, these parts will be disposed generally in the position indicated in Figure 1 when the work object is initially locked or gripped in the vise. Such resilient means may include a helical compression spring 26 having its lower end disposed in a blind vertical hole extending downwardly from the lower portion of the aperture 11, while the upper end of the spring preferably bears against a bushing or collar 24 arranged on the pivot pin 6 within the opening 11. This spring 26 preferably is of such construction that its spring characteristics are sufficient to normally dispose the movable vise parts in the Figure 1 position but to yield or be deformed axially inwardly (i.e. downwardly) upon the application of torques, of relatively large magnitude, to the work object in the direction indicated by an arrow A in Figure 1. It has been found that such deformation or compression of the spring 26, permitted by reason of the clearance afforded to the pivot pin 6 by the larger aperture 11, results in a tightening of the grip of the jaws on the work object Although the precise physical phenomena that occur during this downward swinging movement of the jaws 2, 3 and clamping arm 4 against the action of spring 26 is difficult to explain, it will be appreciated that the additional compression of spring 26 occasioned by such bodily swinging of the movable parts toward base 1 will produce an upwardly directed reaction force acting on the lower jaw 2 through pin 6 to thereby drive or press it with greater force against the lower portion of the work object 22, while downward swinging of the left-hand end of the clamping arm 4 simultaneously operates to prevent reduction in the magnitude of the contact pressure between the abutting surfaces 10, 10a.

The various parts of the vise may be constructed of any suitable material by any desired procedure. In an exemplary construction, the base 1, jaws 2, 3 and clamping arm 4 were made of cast aluminum. It should be evident that the base 1 may be conveniently secured to a work bench or the like, or if desired, the base 1 may be in the form of a handle adapted to be held by a workman.

It has been found that the vise of the invention operates desirably and efficiently on work objects 22 which were pump barrels made of particular alloys whose outer surfaces had to be kept free from scratches and scoring while other sections, such as back-pressure-valve cages, were attached or detached, with the barrel gripped by the vise.

Variations in the contour and inclination of surfaces 10, 10a and in the resilient means utilized to bear upwardly against the jaw 2, within the scope of the invention, will be readily suggested to those skilled in the art. For example, a solid mass of resilient material may be substituted for the spring 26 and the surface 10 may be grooved for reception of mating projections on the surface 10a. Moreover, the vertical dimension of aperture 11, which delimits the bodily swinging movement of jaws 2, 3, about pivot pin 5, can be varied as desired to allow greater or lesser freedom in this movement than that permitted by the illustrated relative dimensions of the involved structures.

In actual practice, the work object is usually arranged in the vise of the invention so that the most frequently applied torques on the work object will be in the direction indicated by the arrow A. It will be evident that the quick-opening latch, including the swingable screw 8, greatly facilitates loading and unloading operations so that the position of the work object in the vise may be conveniently reversed whereby torques in the direction A will act in the opposite direction on the work object. Stated differently, the advantages of the additional tightening effect realized upon bodily swinging of the jaws toward the base, as explained above, can be made available irrespective of the direction of torque to be experienced by the work object, merely by reversing the position of the work object in the vise so that the torque to be applied will act in the direction A of Figure 1. In connection with unloading operations, it is preferred to arrange what may be termed a "lifting" lug 10b on one or more of the ears 17 of arm 4 (see Figures 1 and 3). These lugs 10b, as shown in dotted lines in Figure 1, are disposed directly below the surface 10a adjacent the surface 10 of jaw 3 when the vise is loaded. By virtue of this arrangement, it will be evident that lugs 10b will be swung with the arm 4 when the vise is being unloaded so that they (lugs 10b) strike the jaw 3 under surface 10 and effect a slight initial upward movement thereof. This feature has been found to facilitate unloading particularly in the event the jaws tend to seize upon or otherwise adhere to the workpiece during use.

The improved tightening action afforded by the vise of the invention also satisfactorily holds the work object against radial or axial forces exerted thereon. Furthermore, clockwise torques applied to the work object, as viewed in Figure 1 (i.e. opposite to direction A), are also satisfactorily resisted by the grip of the vise on the work object.

It will thus be seen that the objects of this invention have been fully and effectively accomplished. It will be realized, however, that the foregoing specific embodiment has been shown and described only for the purpose of illustrating the principles of the invention and is subject to extensive change without departure from such principles. Therefore, this invention includes all modifications encompassed within the spirit and scope of the appended claims.

We claim:

1. A vise comprising: a base; pivotally interconnected jaws adapted to grip a cylindrical work object; said jaws being connected to said base; a clamping arm pivoted at a first portion to one of said jaws and swingable into abutting engagement with a free end of another of said jaws to retain said jaws in closed position; said arm extending from said portion transversely across an embraced work object and terminating in a free end; and means on said base operatively connected to said free end of said arm to hold said arm in its jaw-closing position.

2. A vise comprising: a base; pivotally interconnected jaws adapted to grip a cylindrical work object; said jaws being pivoted to said base and continuously urged by their weight to pivot bodily toward said base; a clamping arm pivoted to one of said jaws and swingable into abutting engagement with a free end of another of said jaws to retain said jaws in closed position; and means on said base operatively connected to said arm to hold said arm in its jaw-closing position and to vary the grip of said jaws on a work object embraced thereby.

3. The structure defined in claim 2 wherein means are provided on said base operable on bodily swinging movement of said jaws toward said base to tighten the grip of said jaws on a work object embraced thereby.

4. The structure defined in claim 3 wherein said means operable on bodily swinging movement of said jaws comprises resilient means bearing against said base and said jaws for continuously urging said jaws to swing away from said base.

5. A vise comprising: a base; pivotally interconnected first and second jaws adapted to grip a cylindrical work object; said jaws being pivoted to said base and continuously urged by their weight to pivot bodily toward said base; a clamping arm pivoted to said first jaw and swingable into abutting engagement with a free end of said second jaw to retain said jaws in closed position, said clamping arm extending transversely across a work object embraced by said jaws and terminating in a free end; means on said base engaging said free end of said arm to hold the latter in its jaw-closing closed jaw position; and resilient means on said base resisting bodily pivotal movement of said jaws toward said base.

6. The structure defined in claim 5 wherein said means engaging said free end of said arm is adjustable to tighten the grip of said jaws on a work object embraced thereby; and wherein said resilient means bears against the end of said clamping arm opposite said free end thereof.

7. A vise comprising: a base; pivotally interconnected first and second jaws adapted to embrace a cylindrical work object; said jaws being pivoted to said base for bodily swinging movement about a first axis relative to said base; a clamping arm connected to the first of said jaws for pivotal movement therebetween about a second axis, said clamping arm having means thereon engageable with a free end of the second of said jaws to lock said jaws in closed position; means for detachably connecting said clamping arm to said base; the free end of said second jaw and said second pivotal axis being disposed on the opposite side of a work object embraced by said vise from the side on which said first pivotal axis and said detachably connecting means are disposed.

8. The structure defined in claim 7 wherein said first pivotal axis is disposed intermediate an object embraced by said jaws and said detachably connecting means.

9. The structure defined in claim 7 wherein the weight of said jaws urges them to pivot bodily toward said base and about said first axis; and wherein means are provided on said base for limiting the bodily pivotal movement of said jaws.

10. The structure defined in claim 9 wherein resilient means are provided to overcome the weight of said jaws and continuously urge them to pivot bodily away from said base so that torques applied to a work object embraced by said jaws, causing said jaws to pivot bodily toward said base, will be effective to tighten the grip of said jaws on an embraced work object.

11. A vice comprising: a base; a plurality of pivotally interconnected jaws adapted to grip a cylindrical work object, said jaws being pivoted to said base so that their weight continuously urges them to pivot bodily toward base about a first axis; means for limiting the bodily pivotal movement of said jaws relative to said base in either direction; resilient means overcoming the weight of said jaws and normally disposing them at their limit position farthest from said base; a clamping arm pivoted to the first of said jaws for pivotal movement therebetween about a second axis; said arm and a free end of the second of said jaws having engageable surfaces thereon for retaining said jaws in closed position; and means on said base engageable to said clamping arm for increasing the contact pressure between said surfaces.

12. The structure defined in claim 11 wherein said clamping arm includes means operable to lift said second jaw away from said first jaw when said clamping arm is pivoted away from said jaws.

13. The structure defined in claim 11 wherein said first axis and said means on said base are disposed on one side of an object embraced by said jaws and wherein said second axis and said free end of said second jaw are disposed on the opposite side of an object embraced by said jaws.

14. The structure defined in claim 13 wherein a pin pivotally connects said clamping arm to said first jaw, a lug extending upwardly from said base and having an opening therein, and said pin being loosely disposed in said opening and extending transversely therethrough.

15. The structure defined in claim 14 wherein said resilient means is disposed in said opening in said lug and bears upwardly at one end against said pivot pin.

References Cited in the file of this patent

UNITED STATES PATENTS

| | | |
|---|---|---|
| 1,516,229 | Cameron | Nov. 18, 1924 |
| 1,604,100 | Kennerson | Oct. 19, 1926 |
| 1,861,745 | Kneeland | June 7, 1932 |